United States Patent [19]
Thomas et al.

[11] Patent Number: 5,631,953
[45] Date of Patent: May 20, 1997

[54] CIRCUIT ARRANGEMENT FOR INTEGRATION OF EDP SYSTEMS IN THE UTILIZATION OF TELEPHONE SYSTEMS

[75] Inventors: Gottfried Thomas, Hückelhoven; Ulrich Mergemann, Pulheim, both of Germany

[73] Assignee: CSB-System Software -Entwicklung & Unternehmungsberatung GmbH, Geilenkirchen, Germany

[21] Appl. No.: 522,313
[22] PCT Filed: Feb. 26, 1994
[86] PCT No.: PCT/DE94/00229
 § 371 Date: Aug. 25, 1995
 § 102(e) Date: Aug. 25, 1995
[87] PCT Pub. No.: WO94/21091
 PCT Pub. Date: Sep. 15, 1994

[30] Foreign Application Priority Data

Mar. 5, 1993 [DE] Germany .................. 9303214 U

[51] Int. Cl.$^6$ .................................................. H04M 11/00
[52] U.S. Cl. .............................. 379/94; 370/385; 379/399
[58] Field of Search ................... 379/94, 93, 96–100, 379/242, 387, 399; 370/110.1, 85.13; 375/216; 348/14–16

[56] References Cited

U.S. PATENT DOCUMENTS 5,448,286 9/1995 Decaesteke et al. .................. 379/94
5,453,984 9/1995 Mueller .................. 370/110.1
5,461,620 10/1995 Bergler .................. 370/110.1

*Primary Examiner*—Wing F. Chan
*Attorney, Agent, or Firm*—Michael J. Striker

[57] ABSTRACT

The invention relates to a circuit arrangement for the integration of EDP systems in the use of telephone installations which are connected to the public ISDN or Euro ISDN telephone systems. The aim is to connect a telephone installations to an EDP installation in such a way that all the functions of the EDP system can be used during the use of the telephone installation. This aim is achieved by using a circuit arrangement consisting of: the telephone sets (2;11;13) which are directly connected to the public ISDN or Euro ISDN telephone system (1) via a line (a) and an intelligent telephone installation (3); and an integration component (5) which is arranged between the intelligent telephone installation (3) and the personal computers (4; 12; 14), on the one hand receives signals via the SDLC or ISDN connector (8) by means of line (b) from the public ISDN or Euro ISDN telephone system (1) through the intelligent telephone installation (3) and send signals back to the public ISDN or Euro ISDN telephone system (1), and on the other hand transmits a set of data having suitable information via line (c), an LAN (9) which is connected via line (d) to the LAN server (10) and line (c) to the personal computers (4; 12; 14) and receives the set of data back from the personal computers (4; 12; 14). The conversion of the signals into the set of data and vice versa is performed by the integration component (5) via a computing system (6), a software layer (7) and an SDLC or ISDN connector (8) with internal software.

8 Claims, 1 Drawing Sheet

CIRCUIT ARRANGEMENT FOR INTEGRATION OF EDP SYSTEMS IN THE UTILIZATION OF TELEPHONE SYSTEMS

BACKGROUND OF THE INVENTION

The invention concerns a circuit arrangement for the integration of EDP systems in the utilization of telephone systems connected to the public telephone network ISDN or Euro ISDN.

With the development of data acquisition, processing, evaluation and last but not least its application, the necessary communication requirements increased. There is now an urgent need to find economical solutions which incorporate new ways of integrating speech and data communications systems.

Until today only partial and isolated solutions could be produced satisfactorily for PC-TC links. Present speech and data communications systems are characterized mainly by manual activities and voice communication which are time-consuming and subject to a high loss rate. It is therefore common practice today for speech and data communications to take place in such a way that the caller determines the competent party by telephone, that they then exchange data and information necessary for mutual identification and which form the basis for the subsequently desired voice and data communications of the caller.

The competent party for the call acquires the data and information desired by the caller from his computer or stores additional data and information of the caller in it. If other data and information is then required which the competent party does not have at his disposal, the responsible person must be included as a further competent party in this speech and data communication in the same way as described above. The disadvantage of this speech and data communication is that it is too time-consuming, that incomplete and false information may be transferred due to the speech communication and manual operation of the computer. In addition no data-controlled connection setup is possible with the switching functions
connect
transcouple
release
activation of refer-back
logon
the monitoring system
inquiry of the connection status
disconnect
transfer
brokerage
initiation of multiparty conference
determination of the party status
the control function for the features
parallel or simultaneous fax transmissions and data transfer with ongoing speech and data communication A telephone data service with respect to the control of digital telephone extensions with data entry via a telecommunications and information system and identification of the caller via ISDN or Euro ISDN in the present 1TR6 protocol or the future EDSS1 protocol cannot be protected. Other disadvantages are that data and information which may be available in part in large volumes cannot be transferred mutually in this speech and data communication. This is done subsequently by mailing or by fax. This means even more time is lost and a delay in urgent decision making. Furthermore solutions are known which allow a partly rational speech and data communication by using (special) high-performance telephone extensions. Every telephone extension is connected to only one computer by an expensive circuit card which operates with a specially developed software. Such a solution brings further disadvantages in addition to the high costs. The disadvantages are the impossibility of setting up multiparty conferences especially for data transmission. A direct data transfer from the competent party to the caller and vice versa and the control of digital telephone extensions with data entry via a telecommunications and information system and the identification of the caller by ISDN or Euro ISDN in the present 1TR6 protocol or the future EDSS1 protocol is only possible with a telephone extension and the respective connected computer.

According to DE-OS 4101885 a telecommunications system, a telephone system to be precise, is known which possesses a switching system with terminals and which is connected to a computer for simplified or additional handling of computer-aided communication services. It is distinguished by the fact that the computer is an integral part of the telecommunications system and has an interface which is available not for telecommunications services but for external computer services. This solution also has disadvantages in that all functions of a TC system cannot be used and operated by every computer in the network so that not every type of communication can be generated by all computers in the network (speech and data communication and image transfer).

SUMMARY OF THE INVENTION

Accordingly, it is an object of the present invention to provide a circuit arrangement for integration of EDP systems in the utilization of telephone systems, which avoids the disadvantages of the prior art.

In keeping with these objects and with others which will become apparent hereinafter, one feature of the present invention resides, briefly stated, in a circuit arrangement for integration of EDP systems in utilization of telephone systems connected to a public ISDN or Euro ISDN telephone network, the circuit arrangement comprising a plurality of telephone extensions which are directly connectable to a telephone network selected from the group consisting of a public ISDN telephone network and Euro ISDN telephone network, a first line, an intelligent telephone system arranged so that the telephone extensions are connectable with the at least one telephone network through the first line and the intelligent telephone system, a plurality of personal computers, an integration element arranged between the intelligent telephone system and the personal computers, the integration element receiving signals via at least one connection element selected from the group consisting of an SDLC connection element and an ISDN connection element via a second line from the at least one telephone network via the intelligent telephone system and sending back signals to the at least one telephone network, the integration element also sending a data record assigned an appropriate information via a third line, via a LAN connected to a LAN server by a fourth line and via a fifth line to the personal computers and receiving a data record from the personal computers again, a computing system, and a software layer arranged so that a conversion of the signals into a data record and vice versa is carried by the integration element, by the computing system, by the software layer and by the at least one connection element with an internal software.

It is another feature of the present invention that the personal computers are provided with keyboards so that a speech or data communication between a caller via the at least one telephone network and a competent party on one of the telephone extensions with a respectively assigned one of the personal computers is sent to another competent party and back after the respective competent party has sent a data record assigned the appropriate information to the integration element by operating the keyboard of the respectively assigned one of the personal computers, and a necessary signal leaving the integration element is applied at the intelligent telephone system and a connection to at least one another or every telephone extension is established, so that a connection to every telephone extension simultaneously provides an immediate integration of the personal computer assigned to the telephone extension in the established speech and data communication.

It is also a feature of the present invention that the integration element is formed so that it is possible to hold an applied speech and data communication in conference where required together with at least one further competent party or all parties of the telephone extensions.

It is an additional feature of the present invention that the integration element is formed so that data are transferable when a speech and data communication has been established by every competent part even during a conference and by all competent parties both to and from a caller to every participating competent party and between the competent parties with and without a caller.

It is a further feature of the present invention that the integration element is formed so that in addition to the speech and data communication, a fax transmission is made simultaneously or parallel between the respective competent party and the caller using the keyboard of a respective one of the personal computers by using the connection of the respective personal computer with the at least one telephone network via the fixed line with the LAN with inclusion of the LAN server via the fourth line, via the third line with the integration element comprising the computing system, the software, the at least one connection element with the internal software, and via the second line with the intelligent telephone system.

The advantages of the invention are that a telephone system can be linked to an EDP system in such a way that all functions of the EDP system can be used during utilization of the telephone system.

It guarantees a data-controlled connection setup with the switching functions
connect
transcouple
release
activation of refer-back
disconnect
transfer
brokerage
initiation of multiparty conference
logon
the monitoring system
inquiry of the connection status
determination of the party status
the control function for the features
parallel or simultaneous fax transmissions and data transfer with ongoing speech and data communication Other advantages of the invention are the control of digital telephone extensions with data entry via a telecommunications and information system and identification of the caller by ISDN or Euro ISDN in the present 1TR6 protocol or the future EDSS1 protocol. If the LAN should fail, the speech communication can be maintained. Simple telephone extensions without multi-functions are required to operate this speech and data communication system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
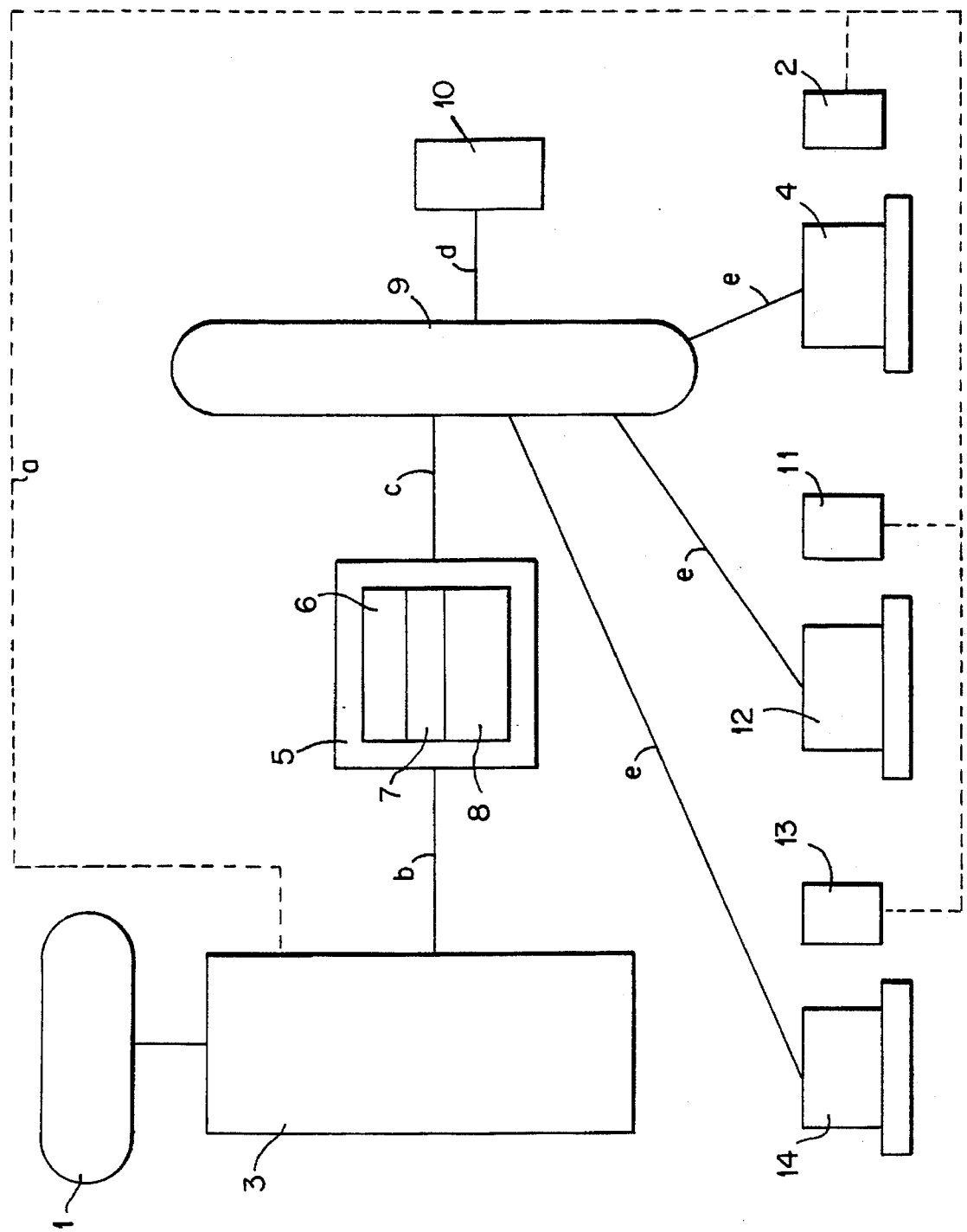
FIG. 1 is a view schematically showing a circuit arrangement for integration of EDP systems in the utilization of telephone systems, in accordance with the present invention.

In order to satisfy the increasing communications requirements, it is necessary to design speech and data communications systems more economically and here the most acute need is for an integration system.

The circuit arrangement for the integration of EDP systems in the utilization of telephone systems illustrated in FIG. 1 is shown by way of explanation on an intelligent telephone system which is connected to the public ISDN or Euro ISDN telephone network externally and internally both via the LAN with three personal computers and with three telephone extensions. However, it should be emphasized that this circuit arrangement can also be used for analog telephone systems with a specially developed software.

When a caller dials a competent party of telephone extension 2 through the public ISDN or Euro ISDN telephone network and the connection is established, the connection is made directly through an intelligent telephone system 3 and a line a to telephone extension 2. At the same time the personal computer 4 assigned to telephone extension 2 establishes a connection with the intelligent telephone system 3 via a line b, an integration element 5 comprising a computing system 6, a software 7 and an SDLC or ISDN connection element 8 with an internal software, a line c, a LAN 9 including the LAN server 10 by means of line d and a line e. With this connection every dialling function is established, the incoming call is identified and all the necessary data are displayed on the personal computer 4. This is realized by the integration element 5 in such a way that when a call is connected to telephone extension 2 a signal is immediately sent on line b by the intelligent telephone system 3 to the integration element 5, which, assigned the appropriate information in a data record by the integration element 5, is passed via the LAN 9 to the associated personal computer 4. Here it is possible to pass the caller data and information directly from the LAN server 10 and its database at the same time as the call arrives. If the party dialled by the caller with telephone extension 2 is not the competent party then the caller can call the competent party, e.g. extension 11 by operating the keyboard of his personal computer 4 and by switching a data record via line e, the LAN 9 via line c to the integration element 5 by the signal generated by the integration element 5, via line b to the intelligent telephone system 3 and from there via the line a. Here too, all the necessary data are displayed immediately after the connection has been made on his personal computer 12, released by signals of the intelligent telephone system 3 which is converted into a data record in the integration element 5 and was sent via LAN 9 with inclusion of the database of the LAN server 10 and the associated lines c; d; e to the personal computer 12 and the necessary communication can take place immediately. If the called or switched competent party, e.g. at extension 11, requires the inclusion of another competent party or several competent parties to clarify questions and data of the caller, he can include these competent parties in a conference by operating the keyboard of his own personal computer 12 and by transferring a data record in the same way as described above via the intelligent telephone system 3 by establishing the connection so that all telephone extensions 2; 11; 13; and personal computers 4; 12; 14 are connected. Whereby all those participating in the conference can transfer data and information to the caller and from the caller to all other participants in the conference. Exchange of data between the competent parties is also possible irrespective of whether a caller is included in the speech and data communication or not.

Parallel to the above mentioned voice and data communication it is possible for every competent party to send the caller a fax.

This simultaneous and parallel fax transmissions next to the ongoing speech and data communication via the connection of the respective personal computer 4, 12 or 14 is made simultaneously via the line e with the LAN 9 with inclusion of the LAN server 10 via the line d, via the line c with the integration element 5 comprising the computing system 6, the software 7 and the SDLC or ISDN connection element 8 with an internal software and via the line b with the intelligent telephone system 3 to the public ISDN or Euro ISDN telephone network and thus to the caller by operating the keyboard of the personal computer 4; 12 or 14.

It will be understood that each of the elements described above, or two or more together, may also find a useful application in other types of constructions differing from the types described above.

While the invention has been illustrated and described as embodied in a circuit arrangement for integration of EDP systems in the utilization of telephone systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A circuit arrangement for integration of EDP systems in utilization of telephone systems connected to a public ISDN or Euro ISDN telephone network, the circuit arrangement comprising a plurality of telephone extensions which are directly connectable to a telephone network selected from the group consisting of a public ISDN telephone network and Euro ISDN telephone network; a first line; an intelligent telephone system arranged so that said telephone extensions are connectable with said at least one telephone network through said first line and said intelligent telephone system; a plurality of personal computers; an integration element arranged between said intelligent telephone system and said personal computers, said integration element receiving signals via at least one connection element selected from the group consisting of an SDLC connection element and an ISDN connection element via a second line from said at least one telephone network via said intelligent telephone system and sending back signals to said at least one telephone network, said integration element also sending a data record assigned an appropriate information via a third line, via a LAN connected to a LAN server by a fourth line and via a fifth line to said personal computers and receiving a data record from said personal computers again; a computing system; and a software layer arranged so that a conversion of the signals into a data record and vice versa is carried by said integration element, by said computing system, by said software layer and by said at least one connection element with an internal software.

2. A circuit arrangement as defined in claim 1, wherein said personal computers are provided with keyboards so that a speech or data communication between a caller via said at least one telephone network and a competent party on one of said telephone extensions with a respectively assigned one of said personal computers is sent to another competent party and back after the respective competent party has sent a data record assigned the appropriate information to said integration element by operating said keyboard of the respectively assigned one of said personal computers, and a necessary signal leaving said integration element is applied at said intelligent telephone system and a connection to at least one another telephone extension is established, so that a connection to every telephone extension simultaneously provides an immediate integration of said personal computer assigned to said telephone extension in the established speech and data communication.

3. A circuit arrangement as defined in claim 1, wherein said personal computers are provided with keyboards so that a speech or data communication between a caller via said at least one telephone network and a competent party on one of said telephone extensions with a respectively assigned one of said personal computers is sent to another competent party and back after the respective competent party has sent a data record assigned the appropriate information to said integration element by operating said keyboard of the respectively assigned one of said personal computers, and a necessary signal leaving said integration element is applied at said intelligent telephone system and a connection to all said telephone extensions is established, so that a connection to every telephone extension simultaneously provides an immediate integration of said personal computer assigned to said telephone extension in the established speech and data communication.

4. A circuit arrangement as defined in claim 2, wherein said integration element is formed so that it is possible to hold an applied speech and data communication in conference where required together with at least one further competent party.

5. A circuit arrangement as defined in claim 2, wherein said integration element is formed so that it is possible to hold the speech and data communication in conference with all parties of said telephone extensions.

6. A circuit arrangement as defined in claim 1, wherein said integration element is formed so that data are transferable when a speech and data communication has been established by every competent part even during a conference and by all competent parties both to and from a caller to every participating competent party and between the competent parties with and without a caller.

7. A circuit arrangement as defined in claim 1, wherein said integration element is formed so that in addition to the speech and data communication, a fax transmission is made simultaneously between the respective competent party and the caller using the keyboard of a respective one of said personal computers by using the connection of the respective personal computer with said at least one telephone network via said fixed line with the LAN with inclusion of the LAN server via said fourth line, via said third line with the integration element comprising said computing system, said software, said at least one connection element with the internal software, and via said second line with the intelligent telephone system.

8. A circuit arrangement as defined in claim 1, wherein said integration element is formed so that in addition to the speech and data communication, a fax transmission is made parallel between the respective competent party and the caller using the keyboard of a respective one of said personal computers by using the connection of the respective personal computer with said at least one telephone network via said fixed line with the LAN with inclusion of the LAN server via said fourth line, via said third line with the integration element comprising said computing system, said software, said at least one connection element with the internal software, and via said second line with the intelligent telephone system.

* * * * *